United States Patent
Saini et al.

(10) Patent No.: US 10,817,387 B2
(45) Date of Patent: Oct. 27, 2020

(54) AUTO POINT IN TIME DATA RESTORE FOR INSTANCE COPY

(71) Applicant: ServiceNow, Inc., Santa Clara, CA (US)

(72) Inventors: Atul Saini, Bellevue, WA (US);
Shaoying Zou, Bellevue, WA (US);
Magesh Narayanan, Redmond, WA (US); Yang Xiang, Issaquah, WA (US)

(73) Assignee: ServiceNow, Inc., Santa Clara, CA (US)

( * ) Notice: Subject to any disclaimer, the term of this patent is extended or adjusted under 35 U.S.C. 154(b) by 164 days.

(21) Appl. No.: 16/116,694

(22) Filed: Aug. 29, 2018

(65) Prior Publication Data

US 2020/0073763 A1    Mar. 5, 2020

(51) Int. Cl.
*G06F 11/14* (2006.01)
*G06F 16/23* (2019.01)

(52) U.S. Cl.
CPC ...... *G06F 11/1469* (2013.01); *G06F 16/2365* (2019.01); *G06F 2201/84* (2013.01)

(58) Field of Classification Search
CPC ............. G06F 11/1469; G06F 16/2365; G06F 2201/84
See application file for complete search history.

(56) References Cited

U.S. PATENT DOCUMENTS

| 5,561,763 | A  | 10/1996 | Eto et al. |
| 6,321,229 | B1 | 11/2001 | Goldman |
| 6,839,894 | B1 | 1/2005  | Joshi et al. |
| 7,020,706 | B2 | 3/2006  | Cates |
| 7,716,353 | B2 | 5/2010  | Golovinsky |
| 7,769,718 | B2 | 8/2010  | Murley |
| 7,925,981 | B2 | 4/2011  | Pourheidari |
| 8,151,261 | B2 | 4/2012  | Sirota |
| 8,402,127 | B2 | 3/2013  | Solin |
| 8,612,408 | B2 | 12/2013 | Trinon |
| 8,646,093 | B2 | 2/2014  | Myers |
| 8,832,652 | B2 | 9/2014  | Mueller |
| 9,065,783 | B2 | 6/2015  | Ding |
| 9,098,322 | B2 | 8/2015  | Apte |
| 9,122,552 | B2 | 9/2015  | Whitney |
| 9,317,327 | B2 | 4/2016  | Apte |
| 9,535,737 | B2 | 1/2017  | Joy |
| 9,645,833 | B2 | 5/2017  | Mueller |
| 9,654,473 | B2 | 5/2017  | Miller |

(Continued)

*Primary Examiner* — Jay A Morrison
(74) *Attorney, Agent, or Firm* — Fletcher Yoder, P.C.

(57) ABSTRACT

Input information comprising an identifier of a production instance is received. The input information indicating a given time a live database from the production instance is to be restored to in a temporary copy of the production instance. Based at least on the input information, backup data associated with the live database from production instance is identified. Based on the backup data, it is determined whether resource capacity is available for restoring the backup data to the temporary copy of the production instance. In response to determining the resource capacity is available, the temporary copy of the production instance is generated. The backup data is restored to the temporary copy of the production instance to represent a state of the live database from the production instance at the given time.

20 Claims, 8 Drawing Sheets

(56) References Cited

U.S. PATENT DOCUMENTS

| | | |
|---|---|---|
| 9,766,935 B2 | 9/2017 | Kelkar |
| 9,805,322 B2 | 10/2017 | Kelkar |
| 9,977,716 B1 * | 5/2018 | Payne .................... G06F 16/128 |
| 10,216,583 B1 * | 2/2019 | Krinke .................. G06F 16/128 |
| 2016/0170844 A1 * | 6/2016 | Long ........................ G06F 16/10 |
| | | 707/679 |
| 2019/0065322 A1 * | 2/2019 | Chakankar .......... G06F 11/1464 |
| 2019/0294509 A1 * | 9/2019 | Bharadwaj .......... G06F 11/1458 |

* cited by examiner

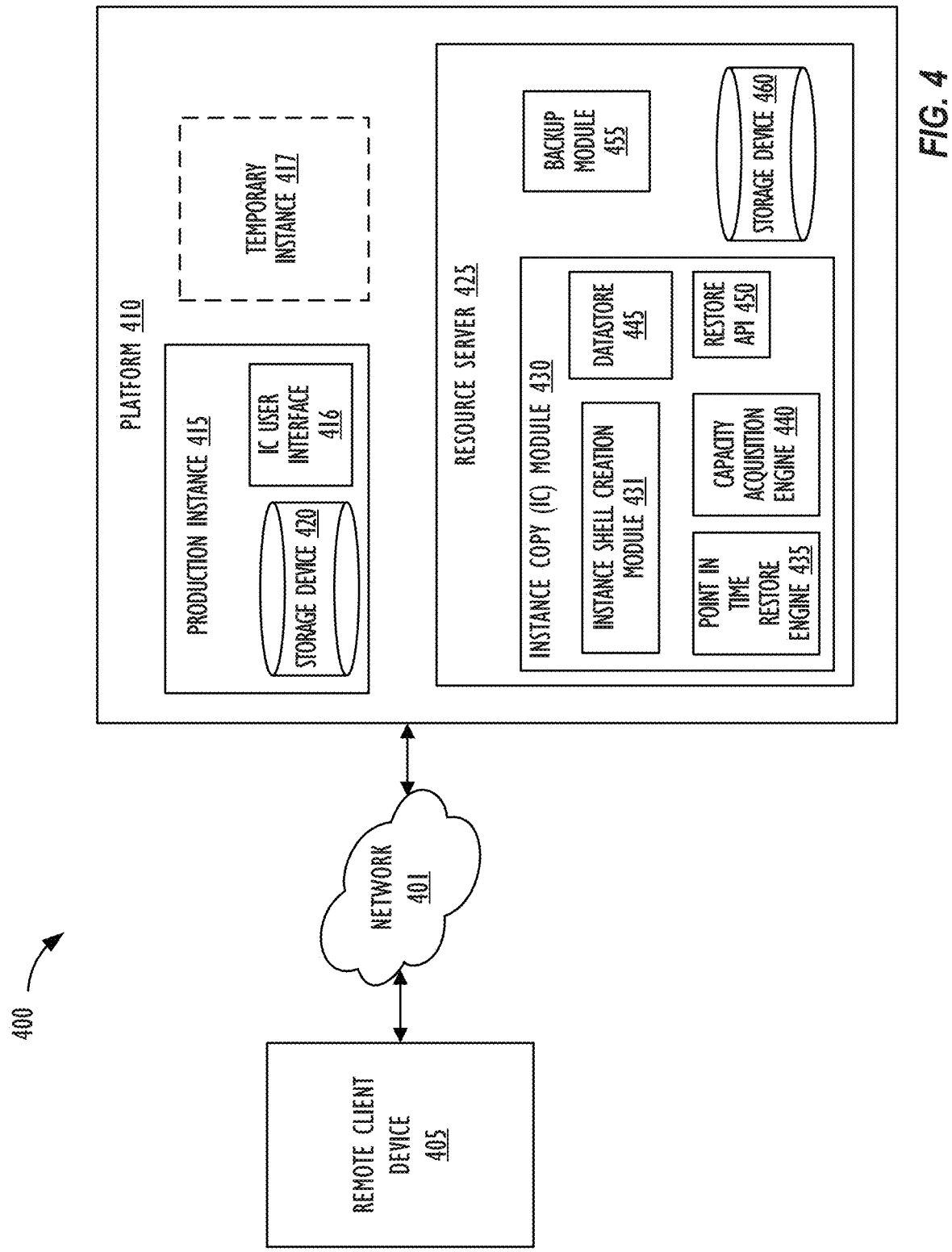

Request a temporary instance that is a copy of a source instance

Overview

Use this Service Catalog to request a temporary instance that is the same version of a source instance (source instance should not have a Shared Database) with one of the following options for its database:

1. Fresh database (no restore from source backup)
2. Restore data from an available back up of the source instance
3. Create an on-demand backup of the source instance and restore that into the temporary instance
4. Point in time restore: (Available for advanced users)
   - Restore data to a specific point in time (UTC) in the past xx hours (subject to availability of bin log files).
   - Operator must specify the desired point in time for the data restore
   - Automation will select the nearest backup and play the transactions using bin log files until the specified point-in-time timestamp.

References

KB Article can be found at KB0621811.

Link: https://abcdef.com/kb_view.do?sysparm_article=KB0621811

Contact Information

Please contact the Instance Automation team at instanceAutomation@abcdef.com with any questions

* Source Instance
▲ More Information

[ 🔍 ]  ← 505

* Incident/CHG Number
▲ More Information

[ ]  ← 510

* Business Justification
▲ More Information

[ ▼ ]

Temporary Instance Details

* Instance Name

[ ▶ ]  ← 515

Order this item
Quantity: 1
Delivery Time: 1 day

[Order now]
[Add to Cart]

Shopping Cart
Empty

* Business justification
  ▲ More Information
  for demo purpose

Temporary Instance Details

* Instance Name
  cidtest13nikhi100109testemp1    ← 605

Instance name is valid.

* Retire Instance After
  1 week    ← 610

* Database options: Please choose what data is needed in the temporary instance:
  ▲ More Information
  Point in time restore: please enter the UTC time when the database will be restored to    ← 615

Point in Time Restore Timestamp (UTC Time)
2018-04-29 12:29:47    ← 620

Successfully verified availability of bin log file    ← 625
Backup found:

| name | End time (UTC) | Level | Type | Size | Result | Source |
|---|---|---|---|---|---|---|
| Cidtest13nikhi040109_3432_db160016_4-4_2018-04-29_012800| 2018-04-29 08:29:45 UTC | 1 | Gen4 | 176 MB | Successful | MySQL_Server@db160016.sea10.service-now.com:3432(primary) |

Running Acquire Capacity Workflow (may take up to 2 minutes)    ← 630

Options
☑ Enable Debug Mode (Scheduled jobs will not be enabled on the temporary instance)
☑ Disable Email    ← 635

600

515

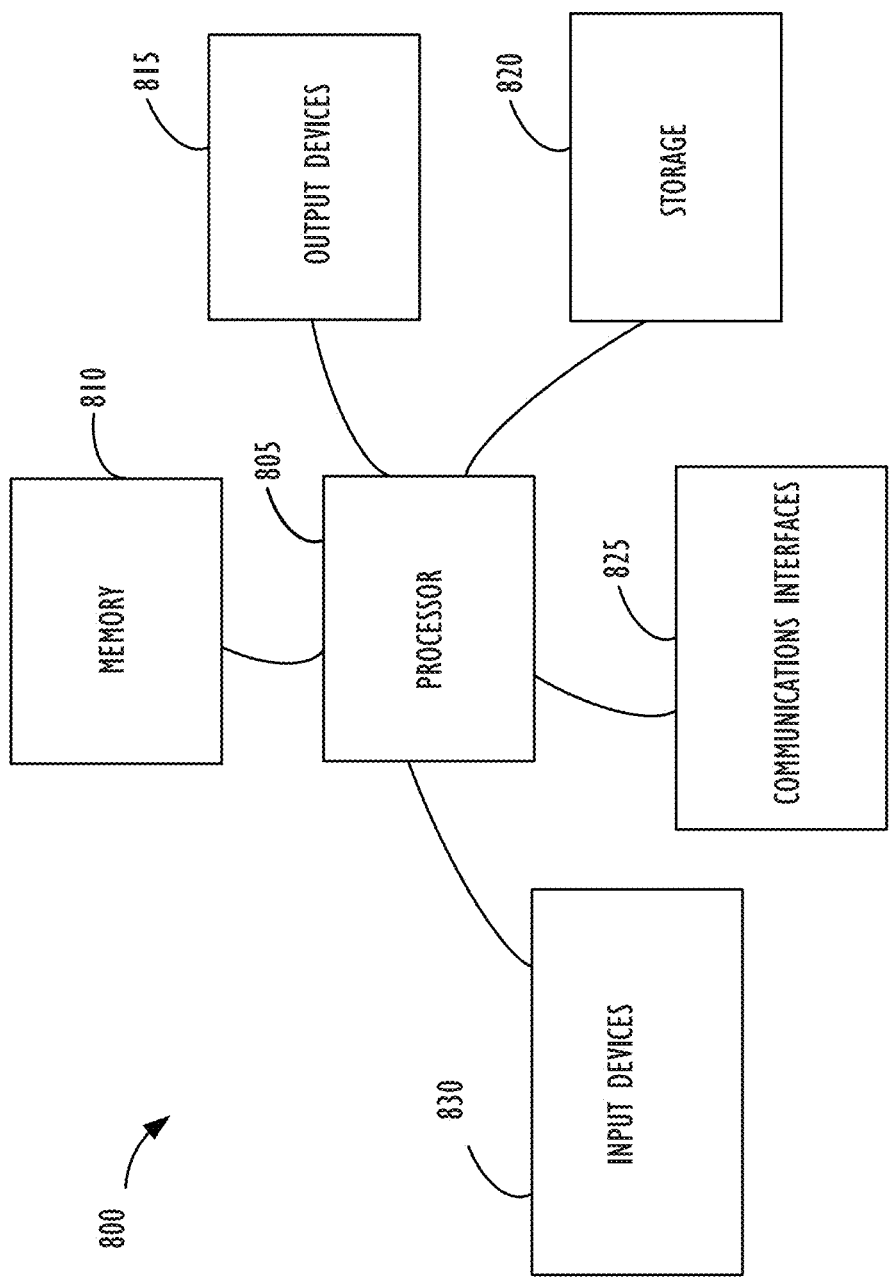

AUTO POINT IN TIME DATA RESTORE FOR INSTANCE COPY

TECHNICAL FIELD

Embodiments described herein generally relate to a production instance, and more particularly, to creating a temporary copy of the production instance to perform predetermined operations (e.g., troubleshooting, debugging, data recovery, scripting, software update, and the like).

BACKGROUND

A variety of enterprise and/or information technology (IT) related software applications may be utilized to support various functions of an enterprise such as Finance, Human Resource (HR), IT, Legal, Marketing, Sales, and the like. The software applications may be deployed on an instance platform on a server and accessed as needed over a network such as a Local Area Network (LAN) or the Internet. The server may be a local enterprise server as part of a self-hosted system or a remote server located in the Cloud as part of a cloud computing system.

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or IT related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

Regardless of whether the instance platform deploying the enterprise and/or IT related software applications is hosted as a self-hosted system (e.g., on a LAN-based local server) or on the Cloud (e.g., SaaS, PaaS, and the like), a service-level agreement (SLA) associated with the instance platform may require high availability, reliability, and uptime for the software applications and enterprise data on the instance platform. An issue associated with the instance platform (e.g., debugging to resolve errors, data recovery after data loss, running new scripts, software updates, troubleshooting, and the like) may cause one or more violations of the terms of the SLA. Further, failed attempts to fix the issue on the instance platform acting as a live production instance with a live database by directly manipulating data on the production instance may cause the additional issues or errors. For example, a failed attempt to recover lost data (e.g., rows in a table of a database) may result in additional loss of data. This may even result in the production instance becoming unstable and/or corrupt. A better approach to resolving issues associated with the instance platform is desirable. It is also desirable to test the behavior of the production instance after a software upgrade of the instance (e.g., whether the new version of the software causes any tables or scripts of the database to get corrupted), before the upgrade is applied to the production instance.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes: receiving input information comprising an identifier of a production instance, the input information indicating a given time a live database from the production instance is to be restored to in a temporary copy of the production instance; identifying, based at least on the input information, backup data associated with the live database from production instance; determining, based on the backup data, whether resource capacity is available for restoring the backup data to the temporary copy of the production instance; in response to determining the resource capacity is available, generating the temporary copy of the production instance; and restoring the backup data to the temporary copy of the production instance to represent a state of the live database from the production instance at the given time.

In another embodiment, the method may be embodied in computer executable program code and stored in a non-transitory storage device. In yet another embodiment, the method may be implemented on a (cloud-based or self-hosted) computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

FIG. 4 illustrates a block diagram of instance copy (IC) system 400 where one or more embodiments of the present disclosure may operate.

FIGS. 5-6 show illustrative screen shots of graphical user interfaces (GUIs) 500 and 600 for requesting a temporary copy of production instance 415 in accordance with one or more disclosed embodiments.

FIG. 8 illustrates a high-level block diagram 800 of a processing device (computing system) that may be used to implement one or more disclosed embodiments.

DESCRIPTION OF EMBODIMENTS

Figure 1:
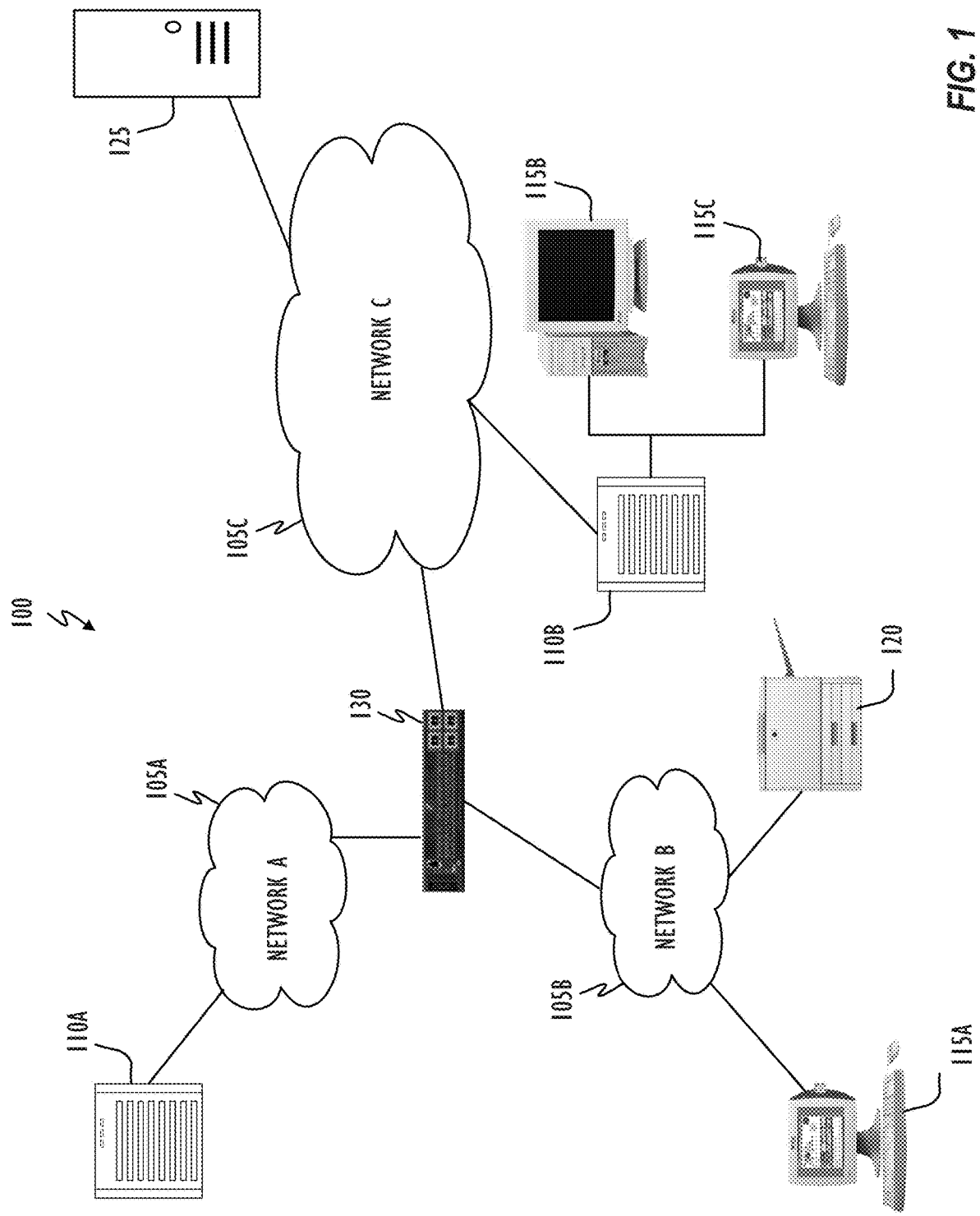
FIG. 1 illustrates a block diagram of self-hosted network system 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other embodiments, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" or "memory" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system or one or more hardware processors. Example embodiments of an application include software modules, software objects, software instances and/or other types of executable code.

This disclosure pertains to creating a temporary copy of a hosted client instance (i.e., production instance, or source instance) to address troubleshoot or perform an operation associated with the hosted client instance. The hosted client instance may encounter an issue while being live as a production instance or a predetermined operation (e.g., software upgrade) may need to be performed on the production instance. For example, a user associated with the hosted client instance (e.g., process owner, service manager, helpdesk manager, IT staff, analyst, development or project manager, management staff, external vendor, Saas or PaaS service provider, site reliability engineer, and the like) may wish to perform a debugging, investigating, or troubleshooting operation to fix an error on the production instance, a data recovery operation to recover lost data (e.g., recover one or more rows or records in one or more tables of a database represented by a database schema) of a live database from the production instance, a scripting operation of testing a new script, or a software update operation of upgrading a software version on the production instance. Since the hosted client instance is a live production instance, any inadvertent operations made on the production instance in an attempt to resolve an issue or perform an operation may result in additional loss of data, generation of additional errors or file corruptions, or generally cause additional problems on the production instance, thereby making the production instance unstable. The user may therefore wish to first perform these operations on a temporary copy (i.e., temporary instance, or test instance) of the production instance to determine whether the operation performed on the temporary instance produces a desired effect without causing additional instance or data issues. Once the operations or modifications performed on the temporary copy of the production instance have been validated or tested for efficacy, the changes may be applied to the production instance for issue resolution or to produce a desired effect without causing unwanted collateral issues.

The temporary copy of the production instance may be an exact copy of the production instance, have the same software version as the production instance, may have the same database schema, same configuration items, reside in the same domain as the production instance, and have all the same security boundaries as the production instance. The live database from the production instance may be copied over (i.e., restored) to the temporary instance by using backup data. The live database may include proprietary data of the enterprise associated with the production instance. The backup data (including a backup file and/or a bin log file) may represent a snapshot of the live database from the production instance at a predetermined point in time and may be restored to the temporary instance. Alternately, an on-demand backup may be performed to copy over on to the temporary instance, a current state of the live database from the production instance. In one embodiment, the system may enable a user to specify a given time to which the live database from the production instance is to be restored to on the temporary copy. Based on the input given time, the system may restore backup data including a corresponding backup file to the temporary instance and further, roll forward individual transactions based on a corresponding bin log file to restore the database on the temporary instance to a specific transaction sequence number corresponding to the specified given time, thereby restoring the database to a restore point in the temporary instance that corresponds to the state of the live database from the production instance at the input given time.

The temporary instance may be created responsive to an incident created by a user (e.g., to resolve an issue or perform an operation or troubleshoot) associated with the hosted client instance. Based on the created incident, the hosted client instance whose temporary copy is to be generated may be identified (e.g., using an identifier). Further, based on the created incident, a point in time to which the database is to be restored to on the temporary instance may also be identified (e.g., based on date and time input by user, or based on date and time of an malfunction event automatically detected by a computer). In one embodiment, the user may provide a given time (e.g., restore timestamp) to which the database is to be restored to on the temporary instance. The system may then automatically identify appropriate backup data (e.g., backup file, bin log file, and the like) corresponding to the given time, including identifying a location where the backup data resides, and copy the backup data onto the temporary instance such that the database from the temporary instance represents a state of the live database from the production instance at the specified given time (i.e., the restore timestamp). The temporary instance may be created in a simplified manner without requiring additional details (e.g., version number, size, data center location of source instance, and the like) from the user. The system may further perform resource acquisition and provisioning for restoring the backup data upfront so that before the temporary instance is created, the system may check to determine if adequate resource capacity (e.g., storage capacity) for restoring the identified backup data to the temporary instance is available. If the capacity is available, the system may create the temporary instance as an 'empty shell' (which may take a long time), and then populate the tables of the database from the temporary instance with the identified backup data to 'restore' the identified backup data to the temporary instance. If the capacity is not available, the system may notify a user to allow the user to either abort the operation early on in the process or to continue creating the temporary instance 'empty shell' while the user (or system, automatically) attempts to free up resources to create capacity for restoring the backup data. If the user chooses to continue creating the temporary instance after it is determined that the resource capacity is not available, the system may again check ($2^{nd}$ try) after creation of the temporary instance is completed to determine if the resource capacity for restoring the identified backup data onto the temporary instance is now available. Performing capacity check and resource acquisition upfront thus helps the user save time in case the capacity is unavailable, instead of discovering the unavailability after the 'empty shell' temporary instance has been created (which may result in waste of time).

FIG. 1 depicts an illustrative self-hosted network system 100 where one or more embodiments of the present disclosure may operate. This illustrative network system 100 may include a plurality of networks 105, (i.e., 105A, 105B, and 105C), each of which may take any form including, but not limited to, a local area network (LAN) or a WAN, such as the Internet. Further, networks 105 may use any desired technology (wired, wireless, or a combination thereof) and protocol (e.g., transmission control protocol, TCP). Coupled to networks 105 are data server computers 110 (i.e., 110A and 110B) that are capable of operating server applications such as databases and also capable of communicating over networks 105. One embodiment using server computers may involve the operation of one or more central systems to log user session data and identify session signatures of the user session.

Client computers 115 (i.e., 115A, 115B, and 115C), which may take the form of any smartphone, gaming system, tablet, computer, set top box, entertainment device/system, television, telephone, communications device, or intelligent machine, including embedded systems, may also be coupled to networks 105, and/or data server computers 110. In some embodiments, network system 100 may also include network printers such as printer 120 and storage systems such as 125, which may be used to store user session data or other data that are referenced herein. To facilitate communication between different network devices (e.g., data servers 110, end-user computers 115, network printer 120, and storage system 125), at least one gateway or router 130 may be optionally coupled there between. Furthermore, in order to facilitate such communication, each device employing the network may comprise a network adapter circuit and related software. For example, if an Ethernet network is desired for communication, each participating device must have an Ethernet adapter or embedded Ethernet capable ICs. Further, the devices may carry network adapters for any network in which they might participate (including, but not limited to, personal area networks (PANs), LANs, WANs, and cellular networks).

Figure 2:
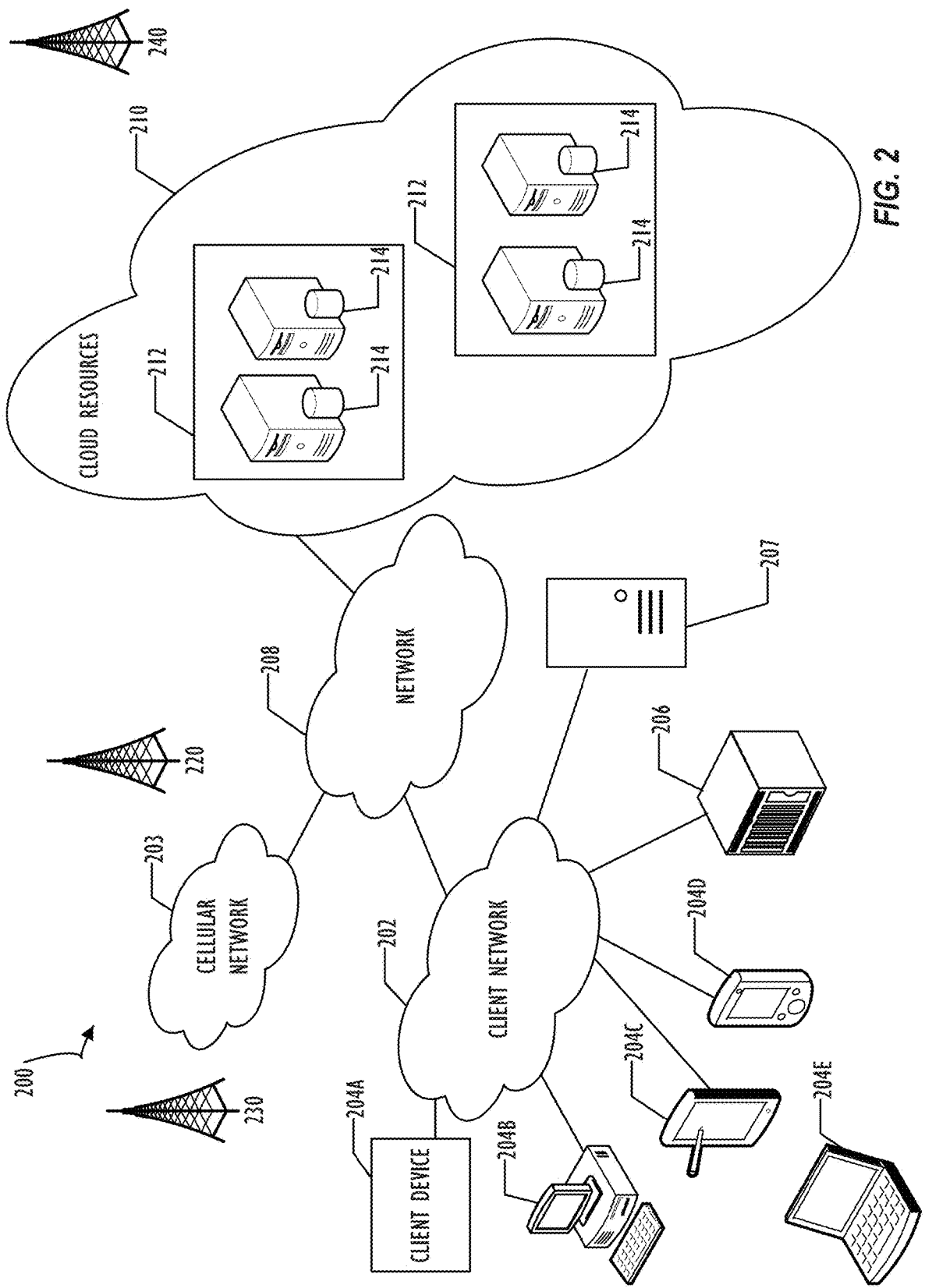
FIG. 2 illustrates a block diagram of cloud computing infrastructure 200 where one or more embodiments of the present disclosure may operate.

FIG. 2 illustrates a block diagram of an embodiment of a cloud computing infrastructure 200 where one or more embodiments of the present disclosure may operate. Cloud computing infrastructure 200 comprises a client network 202, network 208, and a cloud resources platform/network 210. In one embodiment, the client network 202 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 202 represents an enterprise network that could include or be communicatively coupled to one or more local area networks (LANs), virtual networks, data centers and/or other remote networks (e.g., 208, 210). As shown in FIG. 2, client network 202 may be connected to one or more client devices 204A-E and allow the client devices to communicate with each other and/or with cloud resources platform/network 210. Client devices 204A-E may be computing systems such as desktop computer 204B, tablet computer 204C, mobile phone 204D, laptop computer (shown as wireless) 204E, and/or other types of computing systems generically shown as client device 204A. Each of client devices 204A-E may be similar to any of client computers 115 of network system 100 shown in FIG. 1. FIG. 2 also illustrates that client network 202 may be connected to a local compute resource 206 that may include a server, access point, router, or other device configured to provide for local computational resources and/or to facilitate communication amongst networks and devices. For example, local compute resource 206 may be one or more physical local hardware devices configured to communicate with wireless network devices and/or facilitate communication of data between client network 202 and other networks such as network 208 and cloud resources platform/network 210. Local compute resource 206 may also facilitate communication between other external applications, data sources, and services, and client network 202.

FIG. 2 also illustrates that client network 202 may be connected to a computer configured to execute a management, instrumentation, and discovery (MID) server 207. For example, MID server 207 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 207 may be configured to assist functions such as, but not necessarily limited to, discovery, orchestration, service mapping, service analytics, and event management. MID server 207 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 200 also includes cellular network 203 for use with mobile communication devices. Mobile cellular networks support mobile phones and many other types of mobile devices such as laptops etc. Mobile devices in cloud computing infrastructure 200 are illustrated as mobile phone 204D, laptop 204E, and tablet 204C. A mobile device such as mobile phone 204D may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers (e.g., local compute resource 206). In addition, the mobile devices may interact with other mobile devices or with non-mobile devices such as desktop computer 204B and various types of client device 204A for desired services. Although not specifically illustrated in FIG. 2, client network 202 may also include a dedicated network device (e.g., gateway or router) or a combination of network devices that implement a customer firewall or intrusion protection system.

FIG. 2 illustrates that client network 202 is coupled to a network 208. Network 208 may include one or more computing networks, such as other LANs, wide area networks (WANs), the Internet, and/or other remote networks, in order to transfer data between client devices 204A-E and cloud resources platform/network 210. Each of the computing networks within network 208 may contain wired and/or wireless programmable devices that operate in the electrical and/or optical domain. For example, network 208 may include wireless networks, such as cellular networks in addition to cellular network 203. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 208 may also employ any number of network communication protocols, such as Transmission Control Protocol (TCP) and Internet Protocol (IP). Although not explicitly shown in FIG. 2, network 208 may include a variety of network devices, such as servers, routers, network switches, and/or other network hardware devices configured to transport data over networks.

In FIG. 2, cloud resources platform/network 210 is illustrated as a remote network (e.g., a cloud network) that is able to communicate with client devices 204A-E via client network 202 and network 208. The cloud resources platform/network 210 acts as a platform that provides additional computing resources to the client devices 204A-E and/or client network 202. For example, by utilizing the cloud resources platform/network 210, users of client devices 204A-E may be able to build and execute applications, such as automated processes for various enterprise, IT, field service and/or other organization-related functions. In one embodiment, the cloud resources platform/network 210 includes one or more data centers 212, where each data center 212 could correspond to a different geographic location. Within a particular data center 212 a cloud service provider may include a plurality of server instances 214. Each server instance 214 may be implemented on a physical computing system, such as a single electronic computing device (e.g., a single physical hardware server) or could be in the form of a multi-computing device (e.g., multiple physical hardware servers). Examples of server instances 214 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 210, network operators may choose to configure data centers 212 using a variety of computing infrastructures. In one embodiment, one or more of data centers 212 are configured using a multi-tenant cloud architecture such that a single server instance 214, which can also be referred to as an application instance, handles requests and serves more than one customer. In some cases, data centers with multi-tenant cloud architecture commingle and store data from multiple customers, where multiple client instances are assigned to a single server instance 214. In a multi-tenant cloud architecture, the single server instance 214 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 214 causing outages for all customers allocated to the single server instance 214.

In another embodiment, one or more of the data centers 212 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 214 and/or other combinations of server instances 214, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 210, and customer-driven upgrade schedules. An example of implementing a client instance within a multi-instance cloud architecture will be discussed in more detail below when describing FIG. 3.

Figure 3:
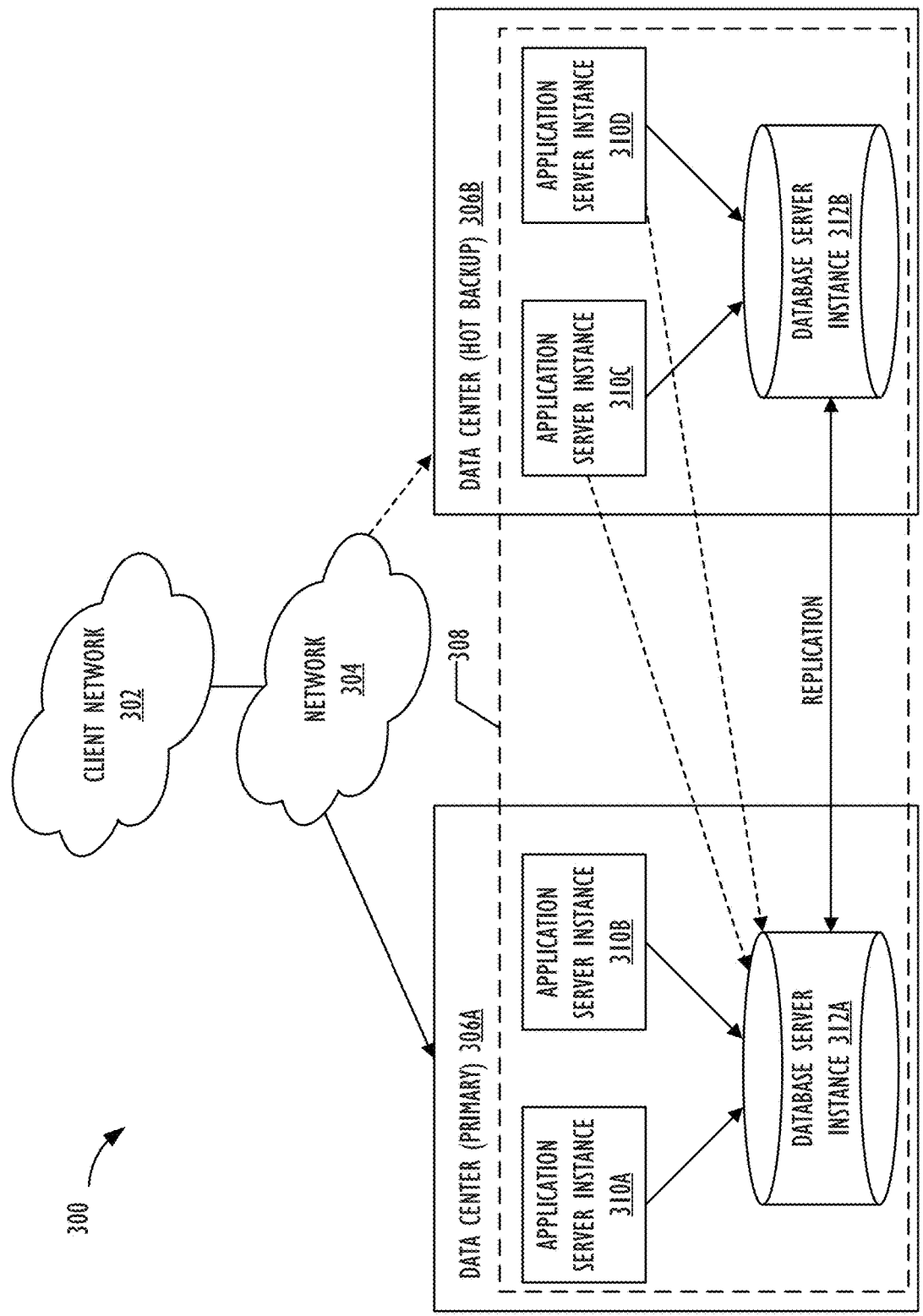
FIG. 3 illustrates a block diagram of multi-instance cloud architecture 300 where one or more embodiments of the present disclosure may operate.

In one embodiment, utilizing a multi-instance cloud architecture, a first client instance may be configured with a client side application interface such as, for example, a web browser executing on a client device (e.g., one of client devices 204A-E of FIG. 2). FIG. 3 illustrates a block diagram of an embodiment of a multi-instance cloud architecture 300 where embodiments of the present disclosure may operate FIG. 3 illustrates that the multi-instance cloud architecture 300 includes a client network 302 that connects to two data centers 306A and 306B via network 304. Client network 302 and network 304 may be substantially similar to client network 302 and network 208 as described in FIG. 2, respectively. Data centers 306A and 306B can correspond to FIG. 2's data centers 212 located within cloud resources platform/network 210. Using FIG. 3 as an example, a client instance 308 is composed of four dedicated application server instances 310A-310D and two dedicated database server instances 312A and 312B. Stated another way, the application server instances 310A-310D and database server instances 312A and 3128 are not shared with other client instances 308. Other embodiments of multi-instance cloud architecture 300 could include other types of dedicated server instances, such as a web server instance. For example, client instance 308 could include the four dedicated application server instances 310A-310D two dedicated database server instances 312A and 312B, and four dedicated web server instances (not shown in FIG. 3).

To facilitate higher availability of client instance 308 application server instances 310A-310D and database server instances 312A and 312B are shown to be allocated to two different data centers 306A and 306B, where one of data centers 306 may act as a backup data center. In reference to FIG. 3, data center 306A acts as a primary data center that includes a primary pair of application server instances 310A and 310B and primary database server instance 312A for client instance 308, and data center 306B acts as a secondary data center to back up primary data center 306A for client instance 308. To back up primary data center 306A for client instance 308, secondary data center 306B includes a secondary pair of application server instances 310C and 310D and a secondary database server instance 312B. Primary database server instance 312A is able to replicate data to secondary database server instance 312B. As shown in FIG. 3, primary database server instance 312A replicates data to secondary database server instance 312B using a replication operation such as, for example, a Master-Master My SQL Binlog replication operation. The replication of data between data centers could be implemented in real time or by implementing full backup weekly and daily incremental backups in both data centers 306A and 306B. Having both a primary data center 306A and secondary data center 306B allows data traffic that typically travels to the primary data center 306A for client instance 308 to be diverted to secondary data center 306B during a failure and/or maintenance scenario. Using FIG. 3 as an example, if application server instances 310A and 310B and/or primary data server instance 312A fail and/or are under maintenance, data traffic for client instance 308 can be diverted to secondary application server instances 310C and 310D and secondary database server instance 312B for processing.

Although FIGS. 2 and 3 illustrate specific embodiments of cloud computing system 200 and multi-instance cloud architecture 300, respectively, the disclosure is not limited to the specific embodiments illustrated in FIGS. 2 and 3. For example, although FIG. 2 illustrates that cloud resources platform/network 210 is implemented using data centers, other embodiments of the cloud resources platform/network 210 are not limited to data centers and can utilize other types of remote network infrastructures. Moreover, other embodiments of the present disclosure may combine one or more different server instances into a single server instance. Using FIG. 3 as an example, application server instances 310 and database server instances 312 can be combined into a single server instance. The use and discussion of FIGS. 1-3 are only exemplary to facilitate ease of description and explanation.

FIG. 4 illustrates a block diagram of instance copy (IC) system 400 where one or more embodiments of the present disclosure may operate. As shown in FIG. 4, IC system 400 may include remote client device 405 and platform 410 that are communicatively coupled to each other through network 401. Remote client device 405 may be substantially similar to any of client computers 115, as described in FIG. 1, and client devices 204A-E, as described in FIG. 2. Network 401 may be substantially similar to any of networks 105, as described in FIG. 1, and client network 202 and network 208, as described in FIG. 2. Detailed description of remote client device 405 and network 401 is omitted here. Platform. 410 may be substantially similar to any of data server computers 110, as described in FIG. 1, local compute resource 206 and server instance 214, as described in FIG. 2, and application server instances 310A-310D database server instances 312A and 312B, as described in FIG. 3. That is, platform 410 may correspond to a server on self-hosted network system 100, as described in FIG. 1, or to a cloud-based server of cloud computing infrastructure 200, as described in FIG. 2.

Platform 410 may include production instance 415, temporary instance 417, and resource server 425. Production instance 415 may be substantially similar to client instance 308, as described in FIG. 3. Production instance 415 may be hosted on any of data server computers 110, as described in FIG. 1, and cloud resources platform/network 210, as described in FIG. 2, and may be accessible by a user of remote client device 405 via network 401 through an application interface such as, for example, a graphical user interface (GUI) or a web browser executing on remote client device 405, in order to access software applications, services, and data deployed on production instance 415. Production instance 415 may include instance copy (IC) user interface (UI) 416 and storage device 420. Production instance 415 may act as a hosted client instance platform for deploying various enterprise and/or IT related software applications and related enterprise data on a live database. The enterprise data may be stored in storage device 420 and may correspond to data of a plurality of rows (or records) of a plurality of tables of the live database. The live database may be updated in real-time as a user interacts with (e.g., insert, update, delete a record in a table) production instance 415. The software applications hosted on production instance 415 may provide coverage in one or more capability areas of the enterprise such as IT, IT support, security, customer service, technical support, e-mail, backup and storage, HR, finance, legal, marketing, sales, compliance, and governance. For example, the software applications may include components related to the following applications and modules of the enterprise: IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Business Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions.

IC UI 416 may act as a front-end user interface for allowing a user of production instance 415 to request a temporary copy (e.g., temporary instance 417) of production instance 415. For example, IC UI 416 may be a front-end of an automation in a service catalog application deployed on production instance 415 that a user may access to submit an order for temporary instance 417. The service catalog application may be deployed on a hosted client instance other than production instance 415, and may allow a user with appropriate privileges to create or request a temporary copy of production instance 415. Alternately, temporary instance 417 may be generated by an administrative user tasked with managing production instance 415 responsive to a created incident (trouble ticket) or other issue associated with production instance 415. For example, a user of production instance 415 may create an incident record (trouble ticket) on production instance 415 to perform a predetermined operation. The predetermined operation may include a troubleshooting operation, a debug operation, a data recovery operation, a scripting operation, a software update operation, and the like. The debug operation (troubleshooting or investigation operation) may involve debugging one or more issues or errors noticed by the user in production instance 415 when production instance 415 has entered into an unhealthy state. Unhealthy state may include software errors, hardware errors, network errors, database errors, and other errors associated with production instance 415. When debugging (troubleshooting), it may be desirable to perform the debug operation on a temporary copy of production instance 415 first, in order to minimize risk and meet SLA requirements of production instance 415. That is, when investigating or debugging, instead of a developer working directly on a live enterprise production instance 415, 'dirty' data representing the data of production instance 415 that has entered the unhealthy state may be copied over to temporary instance 417, and then, while keeping production instance 415 'untouched' (i.e., not interfere with usage of live production instance 415), the developer may perform investigation or debugging operations on temporary instance 417.

The data recovery operation may include an operation to recover lost data. For example, data (e.g., a record in a table) on storage device 420 of the live database from production instance 415 may be inadvertently or maliciously deleted or changed by a user. After realizing the data loss (either by the user or automatically by production instance 415), an incident may be created to generate temporary instance 417 (or temporary instance 417 may be automatically generated) to restore backup data in an attempt to recover lost data. Backup data may be restored to temporary instance 417 first to determine whether restoring the backup data results in a desired data recovery result. In one embodiment, temporary instance 417 may be automatically created and backup data automatically restored thereon to recover lost data.

The scripting operation may include running predetermined scripts (e.g., configuration scripts, enterprise rule scripts, backup scripts, and the like). The scripts may be server-side (run on server or database), client-side (run in user's browser) or on a MID server. The scripts may be used to extend production instance 415 functionality beyond standard configurations by automating processes, adding functionality, integrating production instance 415 with outside applications, and the like. Before the script is used to extend functionality of production instance 415, it may be desired to test the script by running the script on temporary instance 417. After testing on temporary instance 417, and once it is determined that the script produces the desired outcome without causing collateral issues, the script may be installed or deployed on production instance 415 to extended functionality of production instance 415. For example, if there is a performance issue on production instance 415 and a development team determines to add an index, it may be desired to first test the solution on a temporary copy of production instance 415 to determine whether the solution resulted in a successful outcome, before applying changes on production instance 415. Once efficacy of the solution is validated, the same remediation action may be run on production instance 415.

The software update operation may include upgrading the core software application components of production instance 415. As with other operations described above, it may be desired to determine whether updating the software of production instance 415 would result in introduction of errors or issues on production instance 415 or otherwise cause production instance 415 to become unstable. Therefore, the software update operation may first be performed on a temporary copy (e.g., temporary instance 417) of production instance 415. And after determining that the software update is stable and operating as desired, the update operation may be performed on live production instance 415.

In one embodiment, a temporary copy of production instance 415 may be automatically created in the background to apply an instance upgrade and allow a customer to test the upgraded version of the instance before the upgrade is applied to production instance 415. This may enable a user to identify potential issues or conflicts (e.g., table corruptions due to schema change in upgrade) to resolve before attempting to upgrade software of live production instance 415. An analysis module (not shown in the drawings) may be provided to analyze the automatically created temporary copy to identify issues and notify a user of the issues that need resolution prior to achieving a successful upgrade on production instance 415. The analysis module may also provide to a user, heuristics on time duration for the upgrade on temporary instance 417, indices added to support the upgrade, schema changes to be aware of, potential code modules with vulnerabilities resulting from the upgrade, and the like.

Temporary instance 417 may have the same functionality and behavior as production instance 415. For example, temporary instance 417 may appear as an additional instance associated with the enterprise associated with production instance 415. Temporary instance 417 may reside in the same domain as production instance 415, have the same security boundaries, same data center, same size, and same software version. That is, temporary instance 417 may have relevant attributes and configuration environment that is identical to that of production instance 415. However, in one embodiment, certain functionalities and features of temporary instance 417 may be disabled vis-a-vis production instance 415. For example, temporary instance 417 may not be allowed to run scheduled jobs that run on production instance 415. Further, unlike production instance 415, temporary instance 417 may not allow its users to send or receive emails.

Temporary instance 417 may further include information readily indicating to a user that it is a temporary instance that will be retired or destroyed within a predetermined period of time. For example, when a user logs into temporary instance 417, a banner may be displayed indicating that it is a temporary instance for troubleshooting predetermined issues with production instance 415 and that it is scheduled to expire at a given date and time.

Resource server 425 may also be provided on platform 410. Production instance 415 and resource server 425 may be configured to communicate with each other in any suitable manner. For example, production instance 415 and resource server 425 may communicate via a private local area network or via a public network such as the Internet. Client instance 415 and resource server 425 may be provided on the same or on different data centers and/or server instances (e.g., same or different server computers 110, same or different data centers 212, same or different server instances 214, and the like).

Resource server 425 acts as a shared resource including modules and features available for multiple production instances 415 on platform 410. Resource server 425 may include instance copy (IC) module 430, backup module 455, and storage device 460. IC module 430 may provide the back-end automation functionality that corresponds to the front-end IC UI 416 and that enables a user (or administrative user) associated with production instance 415 to make a temporary copy (e.g., temporary instance 417) of production instance 415.

Backup module 455 may include back-end logic to backup respective live enterprise databases from multiple deployed production instances including production instance 415. Backup module 455 may backup data of the live database from production instance 415 (i.e., one or more records on one or more tables of a database having a particular database schema) on a periodic or aperiodic basis, and store the generated backup data on storage device 460 or another location on platform 410 or external location. In one embodiment, backup module 455 may include logic to perform full and/or differential backups based on set user preferences. For example, backup module 455 may perform weekly full backups of the live database from production instance 415 and further perform daily differential backups. Alternately, backup module 455 may backup data of the live database from production instance 415 'on demand', responsive to user operation or input. Backup data generated by backup module 455 may include one or more backup files (e.g., backup files of full weekly backups of the live database from production instance) and one or more binary log files (i.e., bin log files). Backup file may refer to an archive file or a collection of one or more computer files and/or related metadata corresponding to data of the live database from production instance 415. The backup file may be used to restore the original data in case of data loss, data corruption, and the like. The binary log files may include a record of all changes made to the live database, including changes to data and/or structure. The binary log files may further include information indicating how long each transaction (or statement) took to execute. In the bin log, each transaction (e.g., insert, update, delete operation on a row in a table) may be identified using a sequence number. Backup module 455 may retain bin log files stretching back a predetermined period of time from the current live database. For example, backup module 455 may generate and retain bin log files for the last 24-96 hours. Although FIG. 4 illustrates an embodiment in which backup module 455 is provided on resource server 425, this may not necessarily be the case. For example, the functionality provided by backup module 455 may be incorporated in production instance 415, and the generated backup data may be stored on storage device 420 or in a remote storage device located on a remote data center.

IC module 430 may include instance shell creation module 431, point in time restore engine 435, capacity acquisition engine 440, datastore 445, and restore application programming interface (API) 450. Instance shell creation module 431 may include logic to create a temporary copy (e.g., temporary instance 417) of production instance 415 responsive to user operation. In one embodiment, the temporary copy may be automatically created when certain predetermined conditions are met. For example, instance shell creation module 431 may automatically create temporary instance 417 when it is desired to perform predetermined troubleshooting operations on production instance 415. The troubleshooting operations may include debugging operations, data recovery operations, software update operations, scripting operations, and the like. The troubleshooting operations may be automatically detected responsive to creation of an incident report (i.e., trouble ticket) by a user.

Temporary instance 417 generated by instance shell creation module 431 may be an exact copy (i.e., clone) of production instance 415, have the same software version as production instance 415, may have the same database schema as production instance 415, reside in the same domain, and/or have all the same security boundaries as production instance 415. In one embodiment, instance shell creation module 431 may be programmed to obtain necessary parameters (e.g., location, tech center, configuration parameters, temporary instance name, life duration of temporary instance, and the like) for creation of temporary instance 417 simply based on an identifier of production instance 415 (i.e., source instance to be copied). Instance shell creation module 431 may then automate creation of temporary instance 417 without requiring additional information from a user. Temporary instance 417 may be considered an 'empty shell' that corresponds to an out of the box (OOTB) implementation of production instance 415 and with the same database schema as production instance 415, but without corresponding enterprise data from the live database of production instance 415. In an alternate embodiment, temporary instance 417 created by IC module 430 may not be an exact copy of the source instance. For example, certain data (e.g., certain tables or rows) from the live database from the source instance may be excluded, while certain additional data may be added to the restored database on temporary instance 417 that is not present on source instance 415.

Point in time restore engine 435 may include logic to restore backup data generated by backup module 455 onto temporary instance 417 generated by instance shell creation module 431. That is, point in time restore engine 435 may provide functionality to a troubleshooting team to go back in time to perform root cause analysis and review a state of the live database from production instance 415 when an issue or error occurred on production instance 415. In one embodiment, a user may specify a given date and time (i.e., restore timestamp) to which the live database from production instance 415 is to be restored to on temporary instance 417. Based on the input date and time, point in time restore engine 435 may control backup module 455, datastore 445, and restore API 450 to restore backup data to temporary instance 417 that represents a state of the live database from production instance 415 at the input date and time.

In particular, based on the input date and time, point in time restore engine 435 may identify a backup file that is generated by backup module 455, that is from among one or more backup files associated with the live database from production instance 415, and that corresponds (e.g., closest in time and before the input time) to the input time. The backup file may be located at storage device 460 or another location and may be automatically identified and located by point in time restore engine 435 based on data from backup module 455. That is, point in time restore engine 435 may include logic to identify the backup file simply based on the input timestamp and identifier of source instance to be copied, regardless of where the file is stored, and without requiring any additional information from a user. Further, point in time restore engine 435 may utilize datastore 445 to restore the identified backup file onto temporary instance 417.

When the relational database management system implemented on platform 410 is MySQL, each transaction (e.g., insert operation, update operation, delete operation, and the like) performed on the live database from production instance 415 may be identified with a sequence number that may increase with time. Point in time restore engine 435 may include logic to convert the input date and time (i.e., restore timestamp) to a specific transaction sequence number used by MySQL. Based on the identified specific transaction sequence number corresponding to the input restore timestamp, point in time restore engine 435 may identify from among one or more bin log files associated with the live database from production instance 415, a bin log file that includes the specific transaction sequence number (i.e., bin log file corresponding to temporal window including restore timestamp). Point in time restore engine 435 may then pass the specific sequence number as input to restore API 450 so that when the restore of the backup file is completed by datastore 445, restore API 450 may roll forward one or more transactions from identified one or more bin log files up to the specific transaction sequence number. The end result may be temporary instance 417 with restored data that represents a state of the live database from production instance 415 at the input date and time.

For example, if a user wishes to restore the database to a state as of 10:00 PM yesterday, and if backup module 455 took a full backup and created a backup file at 8:00 PM yesterday, IC module 430 may restore the backup file taken at 8:00 PM yesterday to temporary instance 417, and then roll forward all transactions that were completed between 8:00 PM and 10:00 PM yesterday based on corresponding transactions sequence numbers identified in corresponding one or more bin log files to recover the database on temporary instance 417 to a state the live database from production instance 415 was at 10:00 PM yesterday.

Capacity acquisition engine 440 may include logic to determine whether resource capacity (e.g., storage capacity, processing capacity, appropriate privileges, and the like) is available for restoring the identified backup data to the temporary copy of production instance 415. In particular, before the process to generate ('empty shell') temporary instance 417 by instance shell creation module 431 is started, capacity acquisition engine 440 may be programmed to determine whether adequate resource capacity to restore the backup data to temporary instance 417 is available (i.e., first resource capacity check). In making the determination, capacity acquisition engine 440 may, for example, compare available storage capacity in storage device 420 or storage device 460 with a file size of the identified backup file associated with the live database from production instance 415. If capacity acquisition engine 440 determines that adequate resource capacity is not available (e.g., lack of storage space to restore backup file to temporary instance 417), capacity acquisition engine 440 may notify a user submitting the order for creating temporary instance 417 of the unavailability. Capacity acquisition engine 440 may further notify the user to perform (or may automatically perform) capacity provisioning (e.g., contact capacity acquisition team to release extra server capacity, change server attributes for adding capacity to server farm, release reserve capacity, and the like).

After notifying user of capacity unavailability, capacity acquisition engine 440 may allow the user to either abort the process or to continue submitting the order for creating temporary instance 417. Capacity acquisition engine 440 may further control instance shell creation module 431 to permit creation of ('empty shell') temporary instance 417 while capacity provisioning is being performed by the user or by capacity acquisition engine 440. After instance shell creation module 431 has completed creation of ('empty shell') temporary instance 417 (this process may take a 1-2 hours or more), capacity acquisition engine 440 may perform a second resource capacity check to again determine whether adequate resource capacity to restore the backup data identified by point in time restore engine 435 to temporary instance 417 is now available.

Notifying the user upfront before generation of 'empty shell' temporary instance 417 of the unavailability may increase efficiency by allocating capacity at an earliest phase, and allow the user to perform or the system to automatically perform capacity provisioning simultaneously while instance shell creation module 431 is creating temporary instance 417. Since temporary instance 417 with restored backup data may be utilized for troubleshooting system critical issues, upfront resource allocation and capacity provisioning while instance shell creation module 431 creates temporary instance 417 may minimize process failure and reduce time waste. With this two-try (fail fast or retry) approach, capacity acquisition engine 440 provides a more user-friendly experience, a better interface with IC UI 416, and/or make instance copy functionality more robust.

An exemplary front-end implementation of IC UI 416 is shown in GUIs 500 and 600 of FIGS. 5-6. FIGS. 5-6 show illustrative screen shots of graphical user interfaces (GUIs) 500 and 600 for requesting a temporary copy of production instance 415 in accordance with one or more disclosed embodiments. A user of production instance 415 may access GUI 500 of FIG. 5 by navigating to an appropriate application (e.g., service catalog application) on production instance 415. Alternately, an administrative user tasked with providing enterprise-level support for production instance 415 deployed as PaaS or SaaS may access GUI 500 of FIG. 5 on a separate client instance to troubleshoot an issue with production instance 415 by generating a temporary copy of production instance 415.

At field 505, a user may input identification information of a source instance (e.g., production instance 415) whose temporary copy is to be generated. For example, an identifier of the source instance may be input by a user based on a created incident record associated with the source instance. Alternately, the source instance identifier may be automatically populated in field 505 based on creation of the incident record or another predetermined operation (e.g., user contacting customer support, automatic detection of data loss, automatic software upgrade, and the like). Field 510 may allow a user to input information regarding an incident record (e.g., incident record identifier, and the like) based on which the temporary copy of the source instance identified at field 505 is being requested. Field 515 may allow a user to input justification behind creating the temporary copy of the source instance.

GUI 500 may continue as GUI 600 of FIG. 6. Field 605 in GUI 600 may allow a user to input a name for the temporary copy of production instance 415. In one embodiment, IC UI 416 may automatically create and populate the temporary instance name in field 605. In filed 610, a user may be allowed to specify when the temporary instance is to be retired or destroyed (i.e., release capacity and/or resources consumed by temporary instance 417 back to platform 410). For example, specifying '1 week' in field 610 may cause IC module 430 to automatically place the temporary copy of production instance 415 in a queue to be retired after 1 week to release capacity back to platform 410. Field 615 may allow a user to specify a database option for what data is needed for troubleshooting in temporary instance 417. For example, the user may choose to create an 'empty shell' temporary instance 417, without restoring any backup data to temporary instance 417. The user may also choose to restore a specific backup file from among one or more backup files associated with the live database from production instance 415. In this case, the chosen backup file may be restored to temporary instance 417, and the restored backup data on temporary instance 417 may represent a state of the live database from production instance 415 as of the date and time the backup file was created. Alternately, the user may choose to create an 'on demand' backup of the live database from production instance 415 and restore the 'on demand' backup file to temporary instance 417.

As shown in FIG. 6, the user may also choose at field 615, 'Point in time restore' as a backup option for temporary instance 417. For 'Point in time restore', the user may specify in field 620, a restore timestamp (date and time) to which the live database from production instance 415 is to be restored to in temporary instance 417. After the restore, the backup database from temporary instance 417 may represent a state of the live database from production instance 415 at the date and time specified by the user in field 620. The user may specify the restore timestamp in field 620 based on audit data indicating a time when an incident or issue occurred on production instance 415.

As further shown in FIG. 6, once the user specifies the restore timestamp at field 620, IC module 430 may identify and locate, and cause IC UI 416 to display, a corresponding backup file at 625 on GUI 600. Further, based on the input timestamp at field 620, IC module 430 may determine whether corresponding bin log files exist to recover the database to the input point in time at temporary instance 417. At 630, capacity acquisition engine 440 may execute a capacity acquisition workflow to determine whether resource capacity is available for restoring the backup file at 625 to temporary instance 417. Thus, by running the capacity acquisition workflow upfront, before the user even submits the order to request the temporary copy of source instance 415, capacity acquisition engine 440 determines whether or not adequate resource capacity is available to complete the restore process. At 635, the user may set additional options (e.g., enable debug mode, disable email, and the like) related to behavior of temporary instance 417. The user may then submit the order request by clicking the 'Order Now' button shown in GUI 500 of FIG. 5.

Figure 7:
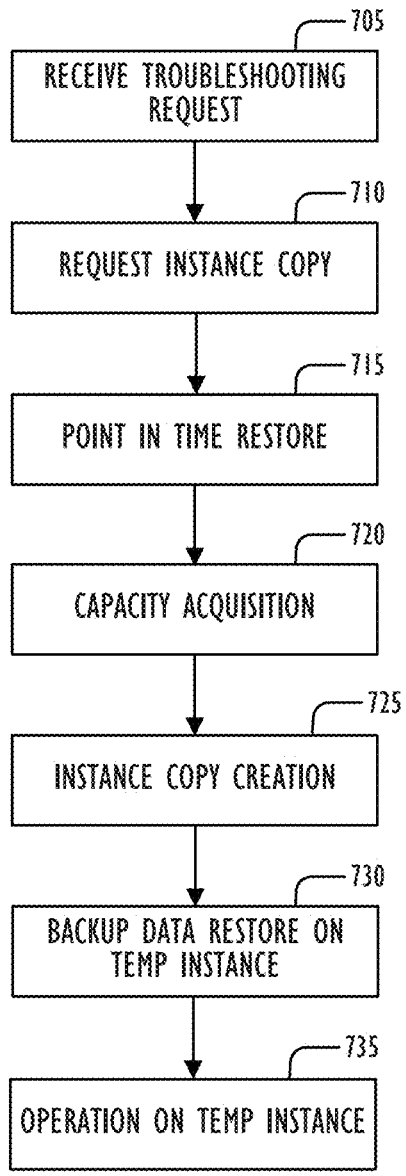
FIG. 7 shows flowchart 700 illustrating operations of IC system 400 in accordance with one or more disclosed embodiments.

FIG. 7 shows flowchart 700 illustrating operations of IC system 400 in accordance with one or more disclosed embodiments. At block 705, resource server 425 may receive a troubleshooting request to perform a troubleshooting operation associated with production instance 415. In one embodiment, a user associated with production instance 415 may create an incident report to identify an issue or error in production instance 415 that requires troubleshooting. Alternately, an administrative user providing support services for production instance 415 may receive a troubleshooting request from a user associated with production instance 415.

At block 710, a user may request a temporary copy of production instance 415 to perform predetermined operations (e.g., debug operation, software update operation, data recovery operation, scripting operation, or another troubleshooting operation). Alternately, at block 710, resource server 425 may automatically request the temporary copy based on predetermined criteria. At block 715, a point in time to which the live database from production instance 415 is to be restored to in temporary instance 417 is identified. For example, the user may specify the point in time at field 620 in GUI 600 shown in FIG. 6. Alternately, resource server 425 may automatically determine the point in time for backup data restore based on a determination regarding when an error (e.g., data loss) occurred on production instance 415. For example, resource server 425 may identify a point in time just before occurrence of the error on production instance 415 to restore the live database to a state just prior to the occurrence of the error.

At block 720, capacity acquisition engine 440 may determine whether resource capacity is available for restoring the backup data to the temporary copy of production instance 415. If resource capacity is unavailable, capacity acquisition engine 440 may notify a user to perform capacity provisioning (or automatically perform capacity provisioning) while still permitting instance shell creation module 431 to continue with the creation of 'empty shell' temporary instance 417. After instance shell creation module 431 has generated temporary instance 417, and before corresponding identified backup data (e.g., backup file, and bin log file up to specific transaction sequence number) is restored on to temporary instance 417, capacity acquisition engine 440 may perform a second resource capacity check to determine whether the resource capacity is now available.

At block 725, instance shell creation module 431 generates temporary instance 417 as an OOTB implementation corresponding to production instance 415. At block 730, point in time restore engine 435 restores backup data on to temporary instance 417 based on input date and time (i.e., restore timestamp) provided by user (or automatically determined by resource server 425). At block 735, one or more predetermined operations (e.g., troubleshooting operations) may be performed on temporary instance 417. Operations may be performed on production instance 415 based on a result of the operations performed on temporary instance 417 at block 735.

FIG. 8 illustrates a high-level block diagram 800 of a processing device (computing system) that may be used to implement one or more disclosed embodiments (e.g., data server computers 110, client computers 115, cloud resources platform/network 210, client devices 204A-204E, client instance 308, server instances 214, data centers 306A-306B, remote client device 405, production instance 415, temporary instance 417, resource server 425, etc.). For example, computing device 800 illustrated in FIG. 8 could represent a client device or a physical server device and include either hardware or virtual processor(s) depending on the level of abstraction of the computing device. In some examples (without abstraction) computing device 800 and its elements as shown in FIG. 8 each relate to physical hardware and in some examples one, more, or all of the elements could be implemented using emulators or virtual machines as levels of abstraction. In any case, no matter how many levels of abstraction away from the physical hardware, computing device 800 at its lowest level may be implemented on physical hardware. As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display). Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 8, processing device 800 includes a processing element such as processor 805 that contains one or more hardware processors, where each hardware processor may have a single or multiple processor cores. In one embodiment, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 8, the processing elements that make up processor 805 may also include one or more other types of hardware processing components, such as graphics processing units (GPUs), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more volatile devices such as random access memory (RAM). Non-volatile storage devices 820 can include one or more disk drives, optical drives, solid-state drives (SSDs), tap drives, flash memory, read only memory (ROM), and/or any other type memory designed to maintain data for a duration time after a power loss or shut down operation. In certain embodiments, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 1005 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 800 may comprise other components well known in the art, such as sensors, powers sources, and/or analog-to-digital converters, not explicitly shown in FIG. 8.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A computer system comprising:
   memory; and
   one or more hardware processors coupled to the memory, wherein the memory comprises computer instructions that, when executed by the one or more hardware processors, cause the computer system to:
      receive input information comprising an identifier of a production instance, the input information indicating a given time a live database from the production instance is to be restored to in a temporary copy of the production instance;
      identify, based at least on the input information, backup data associated with the live database from production instance;
      determine, based on the backup data, whether resource capacity is available for restoring the backup data to the temporary copy of the production instance;
      in response to determining the resource capacity is available based on a first resource capacity check, generate the temporary copy of the production instance and restore the backup data to the temporary copy of the production instance to represent a state of the live database from the production instance at the given time;
      in response to determining the resource capacity is not available based on the first resource capacity check, generate the temporary copy of the production instance and perform a second resource capacity check; and
      in response to determining the resource capacity is available based on the second resource capacity check, restore the backup data to the temporary copy of the production instance to represent the state of the live database from the production instance at the given time.

2. The computer system according to claim 1, wherein the memory comprises computer instructions that, when executed by the one or more hardware processors, cause the computer system to provide a hosted client instance operating as the production instance over a network interface for communicatively coupling with a remote client device.

3. The computer system according to claim 2, wherein the input information comprising the identifier of the production instance is received responsive to an incident created by a user of the remote client device to perform a predetermined operation.

4. The computer system according to claim 3, wherein the predetermined operation includes one or more of: (i) a debug operation for debugging one or more of the temporary copy of the production instance and the backup data restored to the temporary copy of the production instance; (ii) a data recovery operation for recovering lost data for the production instance based on the backup data restored to the temporary copy of the production instance; (iii) a scripting operation for running a predetermined script on the backup data restored to the temporary copy of the production instance before running the script on the production instance; and (iv) a software update operation for applying a software update to the temporary copy of the production instance before applying the software update to the production instance.

5. The computer system according to claim 1, wherein the computer instructions that, when executed by the one or more hardware processors, cause the computer system to identify the backup data associated with the live database from the production instance comprise computer instructions that, when executed by the one or more hardware processors, cause the computer system to:
   identify, from among a plurality of backup files associated with the live database from the production instance, a backup file that corresponds to the given time; and
   identify, from among a plurality of bin log files associated with the live database from the production instance, a bin log file corresponding to a temporal window that includes the given time.

6. The computer system according to claim 5, wherein the computer instructions that, when executed by the one or more hardware processors, cause the computer system to restore the backup data to the temporary copy of the production instance comprise computer instructions that, when executed by the one or more hardware processors, cause the computer system to:
   restore the backup file to the temporary copy of the production instance; and
   roll forward, from among a plurality of transactions listed in the identified bin log file, one or more transactions onto the restored backup file up to a specific transaction sequence number corresponding to the given time.

7. The computer system according to claim 1, wherein the backup data includes at least one of a backup file and a bin log file, and wherein the computer instructions that, when executed by the one or more hardware processors, cause the computer system to determine whether the resource capacity is available comprise computer instructions that, when executed by the one or more hardware processors, cause the computer system to determine whether the resource capacity is available based on a file size of the at least one of the backup file and the bin log file.

8. The computer system according to claim 1, wherein the memory comprises computer instructions that, when executed by the one or more hardware processors, cause the computer system to automatically retire the temporary copy of the production instance after a predetermined period of time has elapsed.

9. A method comprising:
   receiving input information comprising an identifier of a production instance, the input information indicating a given time a live database from the production instance is to be restored to in a temporary copy of the production instance;
   identifying, based at least on the input information, backup data associated with the live database from production instance;
   determining, based on the backup data, whether resource capacity is available for restoring the backup data to the temporary copy of the production instance;

in response to determining the resource capacity is available based on a first resource capacity check, generating the temporary copy of the production instance and restoring the backup data to the temporary copy of the production instance to represent a state of the live database from the production instance at the given time;

in response to determining the resource capacity is not available based on the first resource capacity check, generating the temporary copy of the production instance and perform a second resource capacity check; and in response to determining the resource capacity is available based on the second resource capacity check, restoring the backup data to the temporary copy of the production instance to represent the state of the live database from the production instance at the given time.

10. The method according to claim 9, comprising providing a hosted client instance operating as the production instance over a network interface for communicatively coupling with a remote client device.

11. The method according to claim 10, wherein the input information comprising the identifier of the production instance is received responsive to an incident created by a user of the remote client device to perform a predetermined operation.

12. The method according to claim 11, wherein the predetermined operation includes one or more of: (i) a debug operation for debugging one or more of the temporary copy of the production instance and the backup data restored to the temporary copy of the production instance; (ii) a data recovery operation for recovering lost data for the production instance based on the backup data restored to the temporary copy of the production instance; (iii) a scripting operation for running a predetermined script on the backup data restored to the temporary copy of the production instance before running the script on the production instance; and (iv) a software update operation for applying a software update to the temporary copy of the production instance before applying the software update to the production instance.

13. The method according to claim 9, wherein identifying the backup data associated with the live database from the production instance comprises:

identifying, from among a plurality of backup files associated with the live database from the production instance, a backup file that corresponds to the given time; and identifying, from among a plurality of bin log files associated with the live database from the production instance, a bin log file corresponding to a temporal window that includes the given time.

14. The method according to claim 13, wherein restoring the backup data to the temporary copy of the production instance comprises:

restoring the backup file to the temporary copy of the production instance; and rolling forward, from among a plurality of transactions listed in the identified bin log file, one or more transactions onto the restored backup file up to a specific transaction sequence number corresponding to the given time.

15. The method according to claim 9, wherein the backup data includes at least one of a backup file and a bin log file, and wherein determining whether the resource capacity is available comprises determining whether the resource capacity is available based on a file size of the at least one of the backup file and the bin log file.

16. The method according to claim 9, further comprising automatically retiring the temporary copy of the production instance after a predetermined period of time has elapsed.

17. A non-transitory computer-readable recording medium having stored thereon a program, the program comprising instructions that, when executed by one or more hardware processors, cause the one or more hardware processors to:

receive input information comprising an identifier of a production instance, the input information indicating a given time a live database from the production instance is to be restored to in a temporary copy of the production instance;

identify, based at least on the input information, backup data associated with the live database from production instance;

determine, based on the backup data, whether resource capacity is available for restoring the backup data to the temporary copy of the production instance;

in response to determining the resource capacity is available based on a first resource capacity check, generate the temporary copy of the production instance and restore the backup data to the temporary copy of the production instance to represent a state of the live database from the production instance at the given time;

in response to determining the resource capacity is not available based on the first resource capacity check, generate the temporary copy of the production instance and perform a second resource capacity check; and in response to determining the resource capacity is available based on the second resource capacity check, restore the backup data to the temporary copy of the production instance to represent the state of the live database from the production instance at the given time.

18. The non-transitory computer-readable recording medium according to claim 17, wherein the instructions that, when executed by one or more hardware processors, cause the one or more hardware processors to identify the backup data associated with the live database from the production instance comprise instructions that, when executed by the one or more hardware processors, cause the one or more hardware processors to:

identify, from among a plurality of backup files associated with the live database from the production instance, a backup file that corresponds to the given time; and identify, from among a plurality of bin log files associated with the live database from the production instance, a bin log file corresponding to a temporal window that includes the given time.

19. The non-transitory computer-readable recording medium according to claim 17, wherein the backup data includes at least one of a backup file and a bin log file, and wherein determining whether the resource capacity is available comprises determining whether the resource capacity is available based on a file size of the at least one of the backup file and the bin log file.

20. The non-transitory computer-readable recording medium according to claim 17, wherein the temporary copy of the production instance is configured to automatically retire after a predetermined period of time has elapsed.

* * * * *